July 29, 1958 G. TURKE, SR 2,845,018
COFFEE MAKER
Filed June 28, 1955
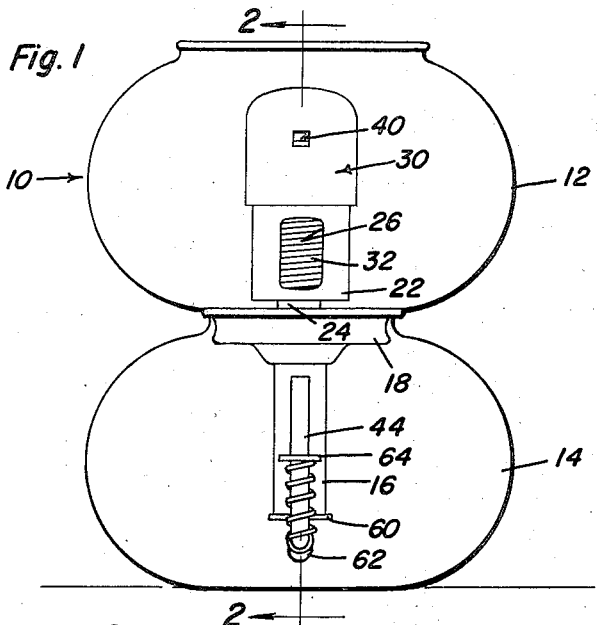
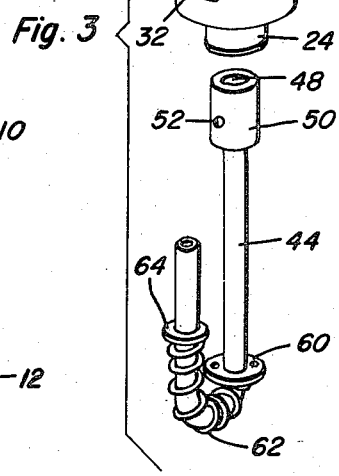
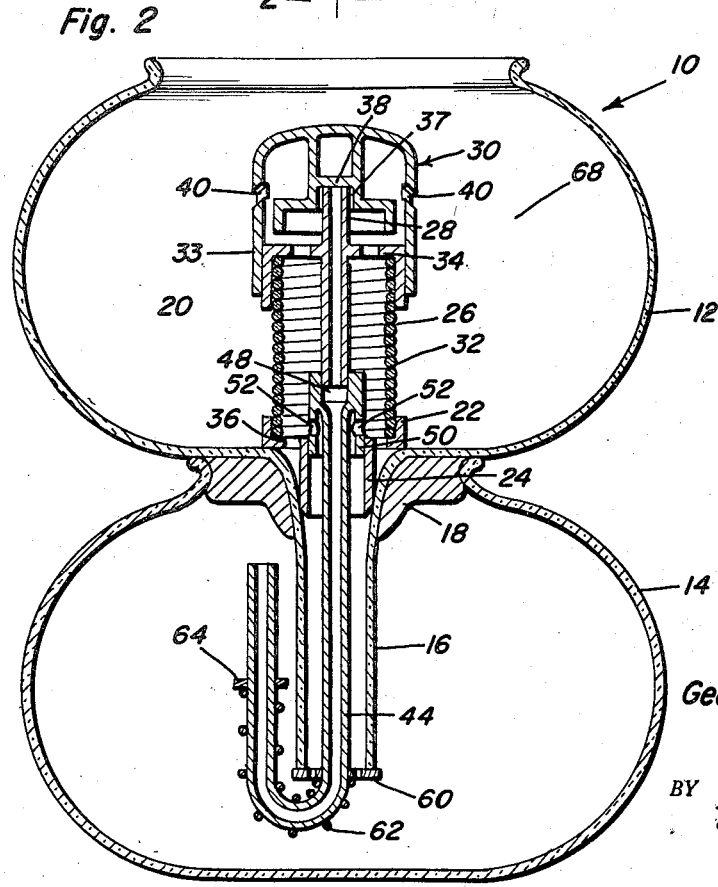
George Turke Sr.
INVENTOR.

United States Patent Office 2,845,018
Patented July 29, 1958

2,845,018

COFFEE MAKER

George Turke, Sr., Hinsdale, Ill., assignor of one-half to Rose Turke, Hinsdale, Ill.

Application June 28, 1955, Serial No. 518,641

3 Claims. (Cl. 99—292)

This invention relates to improvements in coffee makers and particularly to a novel unit interposed in the liquid circulatory path between the upper brewing chamber and the lower pot of a vacuum type coffee maker, the use of which enables more efficient coffee making.

An object of this invention is to provide a coffee maker with a filtering unit which is constructed to allow the liquid in the coffee maker to be raised into the upper brewing chamber, vacuum lowered, and then re-cycled continually, or until such time that the heat is removed from the lower pot either manually or by some type of automatic means.

A more specific object of this invention is to provide a combination pressure valve and filter unit for a coffee maker, the unit being located in part within the upper brewing chamber, the stem which normally establishes communication between the brewing chamber and pot in the vacuum type of coffee maker, and in the lower pot, said unit employing a pressure tube having one end near the top part of the pot so as to be continually exposed to the pressure therearound, a valve in the brewing chamber responsive to the combined effect of its flotation and said pressure, and liquid passageway means adapted to conduct fluid between the brewing chamber and the pot in either direction of flow.

A more general aim of the invention is to provide a coffee maker of such construction and capable of operating in such way that a very large percentage of the flavor in extracted from the ground coffee and yet, derive the inherent advantages and benefits of the vacuum type coffee maker.

Other objects and features will become apparent in following the description of the illustrated form of the invention.

In the drawing:

Figure 1 is an elevational view of one form of coffee maker embodying the invention;

Figure 2 is a sectional view taken substantially on the line 2—2 of Figure 1 and in the direction of the arrows;

Figure 3 is an exploded perspective view of the combined valve and filter unit adapted to be inserted in and used with an otherwise standard vacuum type coffee maker.

The coffee maker 10 consists of an upper brewing chamber 12 together with a lower pot 14 to which it is separably connected. Tubular stem 16 of the brewing chamber is mounted in the customary rubber or plastic gasket 18, the latter being located in the neck of the pot 14 and serving as both a seal and a frictional fastening device for the brewing chamber 12 and pot 14.

In coffee makers of the type generally indicated in the drawing, water is usually placed in the lower pot 14 and when heated, it flows through stem 16 into brewing chamber 12. In this chamber it is mixed with the ground coffee and upon removal from the heat, the coffee returns through stem 16 to pot 14. As far as is known, this completes the coffee brewing cycle in the use of vacuum coffee makers which are presently available. Use of the filtering unit illustrated particularly in Figures 2 and 3, causes the liquid for making coffee to be re-cycled in its brewing operation continually or until such time that the heat is removed from the pot 14.

This unit 20 comprises a housing 22 with a nipple 24 extending from one end thereof. The lower part of housing 22 is adapted to seat upon the bottom of the brewing chamber 12, while the nipple 24 fits snugly into the throat of stem 16. Housing 22 has one or more enlarged lateral openings 26 in it through which fluid is adapted to pass freely. At the end of housing 22 opposite nipple 24 there is a hollow outlet tube 28 through which flow is controlled by valve 30. This valve is preferably constructed of a light weight material such as plastic or light metal since its actuation depends in part on its ability to be floated. A spring which functions as a strainer 32 is confined between the end walls 34 and 36 respectively of housing 22 and covers openings 26.

The valve 30 has a skirt 33 which slides upon the outer surface of the top portion of housing 22 and the valve 30 contains within skirt 33, a cylindrical well 37 the lower end wall 38 of which opens and closes the end of tube 28 upon reciprocation of valve 30. The ports 40 in valve 30 are used for venting the interior of the valve.

A pressure tube 44 forms with outlet tube 28 a pressure passageway whose function is to conduct steam under the pressure in the upper part of pot 14 and apply it to the valve 30. Tube 44 is preferably formed with a quick-disconnect coupling for the lower part of outlet tube 28, whereby tube 44 may be inserted rapidly and easily into the stem 16 and operatively connected with outlet tube 28. A typical coupling comprises an enlargement 48 in the bore of tube 44, dimensioned to accept and frictionally hold a part of tube 28. Annular flange 50 is concentrically arranged with the upper part of tube 44 and forms a means of frictionally connecting the tube with nipple 24. Liquid passageways 52 allow free ingress and egress of fluid through the annular flange 50.

An apertured disk 60 is disposed at the lower end of stem 16 and is held in place by the force of a spring 62 reacting thereon and also upon a spring stop 64, carried by tube 44. This disk aids in holding tube 44 in place yet allows liquid to pass through its apertures.

In operation, the housing 22, its captive spring 32 and valve 30 are placed in brewing chamber 12, being held in place by insertion of nipple 24 into stem 16, as previously described. The tube 44 is then inserted through the bottom open end of stem 16, into housing 22. Annular flange 50 frictionally contacts the inner wall of nipple 24, while the enlarged bore 48 snugly accepts the lower end of the outlet tube 28. Then, the brewing chamber 12 is ready to be fastened to the filled lower pot 14, gasket 18 serving as the dual purpose seal and fastening device. The pot 14 is then placed in the presence of heat, as by putting it on a stove burner, and the water in pot 14 is forced upwardly through stem 16, ports 52 and into brewing chamber 12 to approximately the fluid level 68. Coffee, if not previously added, may now be placed into brewing chamber 12, and if desired, stirred.

The pressure within pot 14 is communicated through the tube 44 and outlet tube 28, to the valve 30. This valve is merely gravity closed and when the pressure in pot 14 together with the buoyancy of valve 30 exceeds a sufficient value, the valve 30 is raised allowing the pressure in pot 14 to be at least partially dissipated. With this pressure dissipation from pot 14, the liquid in brewing chamber 12 is more quickly free to flow through strainer 32, ports 52 and stem 16, into the pot 14. This means that the brewed or partially brewed coffee returning to pot 14 may be further heated for subsequent elevation into brewing chamber 12 until such time that the valve 30 again opens in response to predetermined pressure levels near the top part of pot 14, together with the attaining of a sufficient fluid level in chamber 14 to float valve 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a coffee maker having an upper brewing chamber and a lower pot together with a stem establishing communication between said chamber and pot, a filter unit for the coffee maker comprising a pressure tube in said stem, a valve operatively connected with said tube and adapted to open when the liquid level in said chamber attains a predetermined height in order to vent said pot, a housing in said chamber and in communication with said stem, said valve being guided in its travel by said housing, a strainer carried by said housing and disposed in the path of liquid flow through said stem, and means for releasably securing said housing in said chamber.

2. The coffee maker of claim 1 wherein said housing securing means comprises a nipple which is frictionally fitted in said stem.

3. A coffee maker comprising a lower pot, an upper brewing chamber having a stem extending therefrom which is disposed within the pot, a filter unit in said brewing chamber and comprising a housing, liquid conducting means extending from the housing and removably disposed in said stem for holding said housing in place within said chamber, lateral openings forming liquid passageways in said housing, a strainer disposed in said housing and covering said lateral openings so that liquid flowing between the pot and chamber passes therethrough, a tube extending through said stem and having one end in communication with the upper part of said pot in order to be sensitive to the pressure therein, a pressure outlet tube connected to the housing, means releasably connecting said first mentioned tube and said pressure tube, and a valve for said tubes carried by the housing for venting said pot to relieve a portion of the pressure therein in order to accelerate the return of liquid from said brewing chamber to said pot.

References Cited in the file of this patent

UNITED STATES PATENTS

| | | |
|---|---|---|
| 106,572 | Funk et al. | Aug. 23, 1870 |
| 747,705 | Heinrichs | Dec. 22, 1903 |
| 1,406,814 | Baker | Feb. 14, 1922 |
| 2,027,826 | Keaton | Jan. 14, 1936 |
| 2,313,112 | Wolcott | Mar. 9, 1943 |
| 2,350,335 | Baker | June 6, 1944 |

FOREIGN PATENTS

| | | |
|---|---|---|
| 15,307 | Great Britain | 1885 |
| 11,517 | Sweden | Oct. 6, 1900 |
| 548,064 | France | Oct. 11, 1922 |